United States Patent
Nelson (10) Patent No.: US 7,221,759 B2
(45) Date of Patent: May 22, 2007

(54) PROJECTOR WITH ENHANCED SECURITY CAMCORDER DEFEAT

(75) Inventor: David J. Nelson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 748 days.

(21) Appl. No.: 10/401,208

(22) Filed: Mar. 27, 2003

(65) Prior Publication Data

US 2004/0190716 A1    Sep. 30, 2004

(51) Int. Cl.
H04N 5/74 (2006.01)
H04N 5/913 (2006.01)
H04N 9/31 (2006.01)

(52) U.S. Cl. .................. 380/54; 380/200; 386/117; 386/131

(58) Field of Classification Search .............. None
See application file for complete search history.

(56) References Cited

U.S. PATENT DOCUMENTS

| | | |
|---|---|---|
| 4,441,791 A | 4/1984 | Hornbeck |
| 4,836,649 A | 6/1989 | Ledebuhr et al. |
| 5,357,289 A | 10/1994 | Konno et al. |
| 5,535,047 A | 7/1996 | Hornbeck |
| 5,584,554 A | 12/1996 | Moore et al. |
| 5,597,222 A | 1/1997 | Doany et al. |
| 5,600,383 A | 2/1997 | Hornbeck |
| 5,663,927 A | 9/1997 | Olson et al. |
| 5,680,454 A | 10/1997 | Mead |
| 5,719,695 A | 2/1998 | Heimbuch |
| 5,798,819 A | 8/1998 | Hattori et al. |
| 5,808,795 A | 9/1998 | Shimomura et al. |
| 5,809,139 A | 9/1998 | Girod et al. |
| 5,875,249 A | 2/1999 | Mintzer et al. |
| 5,883,959 A | 3/1999 | Kori |
| 5,907,437 A | 5/1999 | Sprotbery et al. |
| 5,912,972 A | 6/1999 | Barton |
| 5,914,818 A | 6/1999 | Tejada et al. |

(Continued)

FOREIGN PATENT DOCUMENTS

EP    1 220 538 A2    7/2002

(Continued)

OTHER PUBLICATIONS

D. H. Kelly; Visiual Responses to Time-Dependent Stimuli—Amplitude Sensitivity Measurements; Journal of the Optical Society of America, vol. 51, No. 4, Apr. 1961, pp. 422-429.

(Continued)

Primary Examiner—Nasser Moazzami
Assistant Examiner—Chinwendu C. Okoronkwo
(74) Attorney, Agent, or Firm—Nelson Adrian Blish (57) ABSTRACT

A projector (10) with enhanced security camcorder defeat including a copy protection illumination system (1) for illuminating a spatial light modulator (30) comprises: a polychromatic light source (20); uniformizing optics (22) for homogenizing light from the polychromatic light source to provide a uniform illumination field; relay optics; dichroic optics; an interference modulation element (5) located at a plane in an optical path located between the polychromatic light source and the spatial light modulator; and a detection means for determining the absence of the interference modulation element.

21 Claims, 5 Drawing Sheets

U.S. PATENT DOCUMENTS

| | | |
|---|---|---|
| 5,918,961 A | 7/1999 | Ueda |
| 5,930,050 A | 7/1999 | Dewald |
| 5,949,885 A | 9/1999 | Leighton |
| 5,959,717 A | 9/1999 | Chaum |
| 5,960,081 A | 9/1999 | Vynne et al. |
| 6,008,951 A | 12/1999 | Anderson |
| 6,018,374 A | 1/2000 | Wrobleski |
| 6,031,914 A | 2/2000 | Tewfik et al. |
| 6,037,984 A | 3/2000 | Isnardi et al. |
| 6,041,158 A | 3/2000 | Sato |
| 6,062,694 A | 5/2000 | Oikawa et al. |
| 6,069,914 A | 5/2000 | Cox |
| 6,089,717 A | 7/2000 | Iwai |
| 6,122,103 A | 9/2000 | Perkins et al. |
| 6,247,816 B1 | 6/2001 | Cipolla et al. |
| 6,439,725 B1 | 8/2002 | Na |
| 6,513,932 B1 | 2/2003 | Ehrne et al. |
| 6,529,600 B1 | 3/2003 | Epstein et al. |
| 6,809,792 B1 * | 10/2004 | Tehranchi et al. ............ 352/85 |
| 7,006,630 B2 * | 2/2006 | Yu et al. .................... 380/201 |
| 7,043,019 B2 * | 5/2006 | Tehranchi et al. .......... 380/218 |
| 2002/0168069 A1 * | 11/2002 | Tehranchi et al. .......... 380/235 |
| 2004/0033060 A1 * | 2/2004 | Beaton ..................... 386/117 |
| 2004/0247120 A1 * | 12/2004 | Yu et al. ..................... 380/202 |
| 2005/0036613 A1 * | 2/2005 | Zhou et al. ................. 380/203 |
| 2005/0078868 A1 * | 4/2005 | Chen et al. ................. 382/171 |
| 2005/0135789 A9 * | 6/2005 | Beaton ..................... 386/117 |
| 2005/0153787 A1 * | 7/2005 | Kim ........................... 473/160 |
| 2006/0029252 A1 * | 2/2006 | So .............................. 382/100 |

FOREIGN PATENT DOCUMENTS

| | | |
|---|---|---|
| EP | 1 237 369 A2 | 9/2002 |
| JP | A 2000-214779 | 8/2000 |
| JP | A 2000-295274 | 10/2000 |
| WO | WO 00/74366 A2 | 12/2000 |
| WO | WO 01/09676 A1 | 2/2001 |

OTHER PUBLICATIONS

D. H. Kelly; Visual Responses to Time-Dependent Stimuli—Individual Variations; Journal of the Optical Society of America, vol. 52, No. 1, Jan. 1962, pp. 89-95.

* cited by examiner

PROJECTOR WITH ENHANCED SECURITY CAMCORDER DEFEAT

CROSS REFERENCE TO RELATED APPLICATIONS

Reference is made to commonly-assigned U.S. patent application Ser. No. 10/354,424, filed Jan. 30, 2003, entitled A PROJECTOR WITH CAMCORDER DEFEAT, by Kurtz et al., the disclosure of which is incorporated herein.

FIELD OF THE INVENTION

This invention generally relates to a projection apparatus that forms a color image from digital data using a spatial light modulator and more particularly, to an anti-counterfeiting capability which is enabled by the projection apparatus while maintaining a telecentric optical path for both source illumination and modulated light.

BACKGROUND OF THE INVENTION

In order to be considered as suitable replacements for conventional film projectors, digital projection systems must meet demanding requirements for image quality. This is particularly true for multicolor cinematic projection systems. In order to provide a competitive alternative to conventional cinematic-quality projectors, digital projection apparatus must meet high standards of performance, providing high resolution, wide color gamut, high brightness, and frame-sequential contrast ratios exceeding 1,000:1. In addition to these requirements, steps need to be taken to insure the security of the data path and projected images.

The most promising solutions for multicolor digital cinema projection employ, as image forming devices, one of two basic types of spatial light modulators. The first type of spatial light modulator is the digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbuch); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951 (Anderson); and U.S. Pat. No. 6,089,717 (Iwai). Although DMD-based projectors demonstrate some capability to provide the necessary light throughput, contrast ratio, and color gamut; inherent resolution limitations (with current devices providing only 1024×768 pixels) and high component and system costs have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. LCDs appear to have advantages as spatial light modulators for high-quality digital cinema projection systems. These advantages include relatively large device size and favorable device yields. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); and U.S. Pat. No. 6,062,694 (Oikawa et al.).

In an electronic projection apparatus using spatial light modulators, individual colors, conventionally red, green, and blue, are separately modulated in a corresponding red, green, or blue portion of the optical path. The modulated light of each color is then combined in order to form a composite, multicolor RGB color image.

This invention generally relates to an apparatus for displaying a copy protected image while projecting a digital motion picture, where the copy protected image is not significantly degraded as compared to a normally projected image. On the other hand, the copy protected image has a distinguishing attribute that is visible in a recording of the motion picture made using a video capture device such as a video camera.

Whether produced from film or digital sources, images, when projected to a screen for viewing, are subject to illicit duplication. Many techniques have been proposed for a means to prevent off the screen piracy of motion pictures through the use of video recording devices. Illegally copied motion pictures, filmed during projection with video cameras or camcorders and similar devices, are of significant concern to producers of the motion pictures. Even the questionable quality of copies pirated in this fashion does not prevent them from broad distribution. The packaging of these illegal copies can mimic the legitimately distributed media, thus defrauding both the producers and the end users. As video cameras improve in imaging quality and become smaller and more capable, the threat of illegal copying activity becomes more menacing to motion picture providers. While it may not be possible to completely eliminate theft by copying, it can be advantageous to provide display delivery techniques that frustrate anyone who attempts to copy a motion picture using a portable video camera device.

It is known to provide a distinct symbol or watermark to an original still image as a means of image or copy identification, such as in order to authenticate a copy. As examples, U.S. Pat No. 5,875,249 (Mintzer et al.); U.S. Pat. No. 6,031,914 (Tewfik et al.); U.S. Pat. No. 5,912,972 (Barton); and U.S. Pat. No. 5,949,885 (Leighton) disclose methods of applying a perceptually invisible watermark to image data as verification of authorship or ownership or as evidence that an image has not been altered.

The above examples for still-frame images illustrate a key problem: an invisible watermark identifies but does not adversely affect the quality of an illegal copy, while a visible watermark can be distracting and degrades the viewing experience of the intended audience. With video and motion picture images, there can be yet other problems with conventional image watermarking. For example, U.S. Pat. No. 5,960,081 (Vynne et al.) discloses applying a hidden watermark to MPEG data using motion vector data. This method identifies and authenticates the original compressed data stream but would not provide identification for a motion picture that was copied using a camcorder. Other patents, such as U.S. Pat. No. 5,809,139 (Girod et al.); U.S. Pat. No. 6,069,914 (Cox); and U.S. Pat. No. 6,037,984 (Isnardi et al.) disclose adding an imperceptible watermark directly to the discrete cosine transform (DCT) coefficients of a MPEG-compressed video signal. If such watermarked images are subsequently recompressed using a lossy compression method (such as by a camcorder, for example) or are modified by some other image processing operation, the watermark may no longer be detectable.

The watermarking schemes noted above are directed to copy identification, ownership, or authentication. However, even if a watermarking approach is robust, provides copy control management, and succeeds in identifying the source of a motion picture, an invisible watermark may not be a sufficient deterrent for illegal copying. These schemes do not prevent on screen copies to be made, and in addition, require that the watermarking or copy protection be applied to the data stream to the projector.

As an alternative to watermarking, some copy deterrent schemes used in arts other than video or movie display operate by modifying a signal or inserting a different signal to degrade the quality of any illegal copies. The modified or inserted signal does not affect playback of a legally obtained manufactured copy, but adversely impacts the quality of an illegally produced copy. As one example, U.S. Pat. No. 5,883,959 (Kori) discloses deliberate modification of a burst signal to foil copying of a video. Similarly, U.S. Pat. No. 6,041,158 (Sato) and U.S. Pat. No. 5,663,927 (Ryan) disclose modification of expected video signals in order to degrade the quality of an illegal copy.

As a variation of the general method where a signal is inserted that does not impact viewability, but degrades copy quality, U.S. Pat. No. 6,018,374 (Wrobleski) discloses the use of a second projector in video and motion picture presentation. This second projector is used to project an infrared (IR) message onto the display screen, where the infrared message can contain, for example, a date/time stamp, theater identifying text, or other information. The infrared message is not visible to the human eye. However, because the typical video camera has broader spectral sensitivity that includes the IR range, the message can be clearly visible in any video camera copy made from the display screen. The same technique can be used to distort a recorded image with an "overlaid" infrared image. While the method disclosed in U.S. Pat. No. 6,018,374 can be effective for frustrating casual camcorder recording, the method has some drawbacks. A video camera operator could minimize the effect of a projected infrared watermark by applying a commonly available spectral filter designed to block infrared light to the capture lens of his/her camcorder. Video cameras are normally provided with some amount of IR filtering to compensate for silicon sensitivity to IR. Alternately, with a focused watermark image, such as a text message projected using infrared light, retouching techniques could be applied to alter or remove a watermark, especially if the infrared signal can be located within frame coordinates and is consistent, frame to frame.

Motion picture display and video recording standards have well-known frame-to-frame refresh rates. In standard motion picture projection, for example, each film frame is typically displayed for a time duration of $1/24$ second. Respective refresh rates for interlaced NTSC and PAL video recording standards are $1/60$ second and $1/50$ second.

Video camera capabilities such as variable shutter speeds allow close synchronization of a video camera with film projection, making it easier for illegal copies to be filmed within a theater. Attempts to degrade the quality of such a copy include that disclosed in U.S. Pat. No. 5,680,454 (Mead). U.S. Pat. No. 5,680,454, which discloses use of a pseudo-random variation in frame rate, causing successive motion picture frames to be displayed at slightly different rates than nominal. Using this method, for example, frame display periods would randomly change between $1/23$ and $1/25$ second for a nominal $1/24$ second display period. Timing shifts within this range would be imperceptible to the human viewer, but significantly degrade the quality of any copy filmed using a video camera.

Randomization, as used in the method of U.S. Pat. No. 5,680,454, would prevent resynchronization of the video camera to a changed display frequency. While the method of U.S. Pat. No. 5,680,454 may degrade the image quality of a copy made by video camera, this method does have limitations. As noted in the disclosure of U.S. Pat. No. 5,680,454, the range of frame rate variability is constrained, since the overall frame rate must track reasonably closely with accompanying audio. Also, such a method provides no spatial or color disturbance in the illegal copies.

U.S. Pat. No. 5,959,717 (Chaum) also discloses a method and apparatus for copy prevention of a displayed motion picture work. The apparatus of U.S. Pat. No. 5,959,717 includes a film projector along with a separate video projector. The video projector can be used, for example, to display an identifying or cautionary message or an obscuring pattern that is imperceptible to human viewers but can be recorded using a video camera. Alternately, the video camera may even display part of the motion picture content itself. By controlling the timing of the video projector relative to film projector timing, a message or pattern can be made that will be recorded when using a video camera, but will be imperceptible to a viewing audience. The method of U.S. Pat. No. 5,959,717, however, has some drawbacks. Notably, this method requires distribution of a motion picture in multiple parts, which greatly complicates film replication and distribution. Separate projectors are required for the film-based and video-based image components, adding cost and complexity to the system and to its operation. Image quality, particularly for large-screen environments, may not be optimal for video projection and alignment of both projectors to each other and to the display surface must be precisely maintained.

WO 01/33846 A2 (Burstyn) discloses a method and apparatus for anti-piracy that describes an electronic projection apparatus with an interfering source, but it fails to consider the image planes necessary to accomplish the desired interference. The method disclosed by Burstyn does not permit the interference to occur at a plane that is conjugate to the spatial light modulator which is required for projecting an in focus, sharp copy protected image to a screen. As Burstyn is vague concerning the location and design of the interfering means within an electronic projection apparatus, Burstyn does not anticipate either the problems or opportunities related to designing an interfering means into an actual projection apparatus.

Methods such as those described above could be adapted to provide some measure of copy deterrence or watermarking for digital motion pictures. However, none of the methods noted above is wholly satisfactory for the reasons stated. Therefore, there is a need for copy-deterrence techniques that are enabled by internal image digital projector technology. An internal image projection system is ideally suited to the application of interference elements placed at strategic locations in the illumination and imaging optical paths.

The use of an intermediate imaging optical system is known in the design of electronic projection systems. Exemplary prior art systems are described in U.S. Pat. No. 4,836,649 (Ledebuhr et al.); U.S. Pat. No. 5,357,289 (Konno et al.); U.S. Pat. No. 5,907,437 (Sprotberry et al.); U.S. Pat. No. 6,247,816 (Cipolla et al.); and U.S. Pat. No. 6,439,725 (Na). As a particular example, U.S. Pat. No. 5,597,222 (Doany et al.) discloses, for use in a digital projector, an optical relay lens system that is intended to aid in optical tolerance problems and projection lens working requirements. The system of U.S. Pat. No. 5,597,222 provides a single optical relay lens system to create a full color RGB image at unity magnification. This system fails to anticipate many of the advantages a three intermediate image relay optical systems (one per color), each operating at a nominal 2× magnification, provide internal images that are combined prior to a common projection lens. Although the system described in U.S. Pat. No. 5,597,222 lacks many of the advantages of the an internal image projection systems, the projection system of Doany et al. '222 does inherently provides an image plane where the methods disclosed in this application can be applied.

In summary, there is a need for a system to prevent off the screen piracy of motion images which:
Does not degrade the as viewed image
Degrades illicit copies of the viewed image
Is efficient with regard to light throughput
Is easily implemented
Does not require alterations to the motion picture data stream A system which can be easily implemented on digital projection designs and which permit physical access to key planes along the optical axis for incorporation of interference elements is desirable. An example of a desirable plane along the optical axis would be a plane conjugate to the imaging device, for example film or spatial light modulator.

It is an object of the present invention to provide a copy-deterrent projection apparatus for projecting a digital motion picture onto a display screen, a disturbance generator capable of obscuring a color, or colors, of illumination temporally or spatially.

Another object of the present invention is to modulate the color channel which has excess illumination to further optimize the projection system.

Yet another object of the present invention to include a method for preventing the removal of the copy protection apparatus.

Thus, it can be seen that there is a need for improvement in illumination and modulation path optics for digital projection that alleviates the inherent angular limitations of lower cost dichroic coatings while providing maximum brightness and color gamut, as well as access to critical points in the system suited to camcorder defeat methods.

SUMMARY OF THE INVENTION

Briefly, according to one aspect of the present invention a projector with enhanced security camcorder defeat including a copy protection illumination system for illuminating a spatial light modulator comprises: a polychromatic light source; uniformizing optics for homogenizing light from the polychromatic light source to provide a uniform illumination field; relay optics; dichroic optics; an interference modulation element located at a plane in an optical path located between the polychromatic light source and the spatial light modulator; and a detection means for determining the absence of the interference modulation element.

An addition of another switch (most likely with a secure ID) in a series with existing lamphouse safety interlock circuitry. The function of this switch would be to shut down operation of a projector if a camcorder defeat apparatus is removed. Similar to electronic automobile ignition locks, removal of the camcorder defeat device can be prevented by the application of an electronic lock.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Studies show that sensitivity of the human visual system to sinusoidal intensity oscillations decreases dramatically at higher temporal frequencies. Reference is made to Kelly, D. H., "Visual Responses to Time-Dependent Stimuli: Amplitude Sensitivity Measurements" in Journal of the Optical Society of America, Volume 51, No. 4, p. 422; and to Kelly, D. H., "Visual Responses to Time-Dependent Stimuli: III Individual Variations" in Journal of the Optical Society of America, Volume 52, No. 1, p. 89. The human visual system sensitivity to flicker is maximized near the 10-30 cycles/sec range, drops off rapidly at just above 30 cycles/sec, and continues to drop as temporal frequency increases. For temporal frequencies above a cutoff frequency, there is essentially no perception of flicker regardless of the stimulus amplitude. This cutoff frequency occurs somewhere around 50-70 Hz for the light adaptation levels that occur in typical display systems.

Relevant to the present invention, when a sequence of motion picture frames is displayed at a sufficiently high temporal frequency, a human observer does not detect flicker but instead integrates the sequence of frames to perceive the effect of images in smooth motion. However, video cameras do not use the same detection mechanisms as the human visual system. Thus, it is entirely possible for a time-varying illumination to be captured by a video camera while the human observer detects only a steady illumination.

One object of the present invention is to provide, an apparatus and method for frustrating illegal filming of a digital motion picture using a video camera that utilizes this inherent difference in sensitivity of the human visual system and the recording means. In general, the present invention operates by inserting a time-varying disturbance, where the time-varying pattern cannot be detected by the unaided eye but is clearly visible from a video camera. In addition, the present invention provides a digital motion picture projection system which has the ability to separately modify the color channel illumination (or imaging) systems as a further means of copy protection.

With digital motion picture projection, the "image frame" presented to the viewer is a projection of a two-dimensional pixel array. In a digitally projected movie, there is no need for shuttering. The projected frames consist of individual pixels, typically made up of three primary component colors red, green, and blue (RGB) and having variable intensity, where the frames are refreshed at regular intervals. This refresh rate may be ¹⁄₂₄ of a second or higher. Because motion pictures are typically captured at 24 frames/sec, the description that follows uses a 24 Hz frame refresh rate as the fundamental rate to be used for digital motion picture projection A video camera operates by sampling a scene at regular time intervals. By sampling at a fast enough rate, a video camera can reproduce time-varying scenes with sufficient accuracy for the human visual system to perceive the temporally sampled data as continuous movement. However, the complication with video camera sampling of a motion picture is that the motion picture display is not truly continuous, as is noted above. Thus, attempting to capture a motion picture using a video camera introduces the complexity of sampling a time-varying image display using a time-varying sampling apparatus. Intuitively, it can be seen that some synchronization of sampling rate to refresh rate would be most likely to yield satisfactory results.

Certainly, it may be possible to adjust the sampling rate of a capturing device to provide synchronization between the video camera capture frequency and the motion picture projector frequency. Frame-to-frame synchronization of a video camera capture frequency to a motion picture projector frequency then enables illegal filming of a displayed motion picture with few, if any, imaging anomalies due to timing differences. In a preferred embodiment of the method and apparatus of the present invention is intended to prevent or frustrate any type of adequate synchronization, thereby deliberately causing interference due to frequency differences to obscure or mark any copy of a motion picture obtained using a video camera.

The baseline sampling rates for video cameras can vary over a range of discrete values. Typical sampling rates for most video cameras commercially available are in a range between 60-120 Hz. For example, the NTSC and PAL video standards, conventionally used for commercially available video cameras, use discrete rates of 50 and 60 fields per second, respectively. Optionally, in some of the so-called flickerless video cameras, multiples of these base rates can be used, allowing higher sampling rates of 100 or 120 Hz, respectively. These rates are, in turn, easily convertible to the 50 and 60 fields per second replay rates that are used in most TVs and VCRs.

It must be noted that the present invention is not constrained to any assumption of video camera sampling rate being at a specific value. However, for the purpose of description, a standard, discrete sampling rate within the 50-120 Hz range is assumed.

Figure 1:
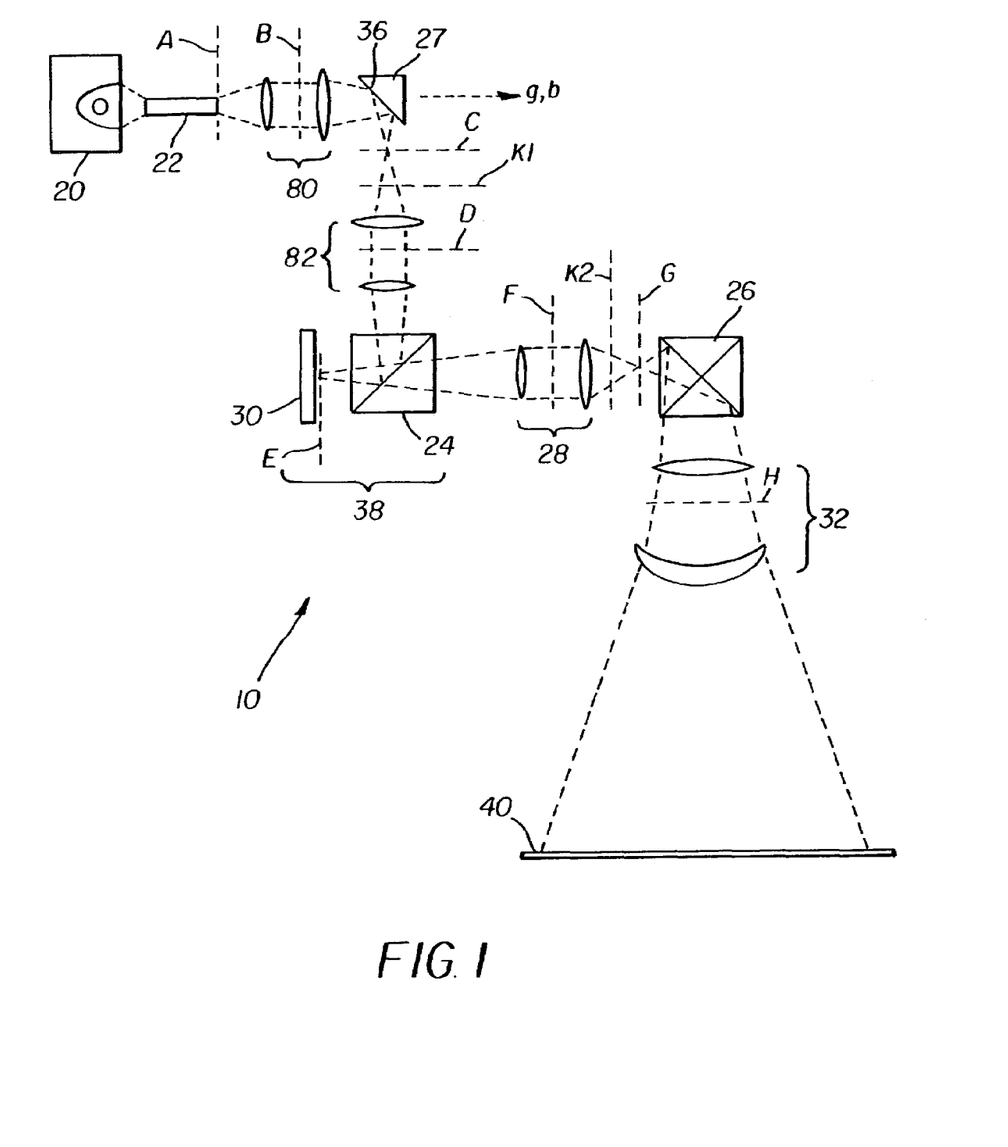
FIG. 1 is a schematic view showing components in the illumination path and one of the modulation paths.
Figure 2:
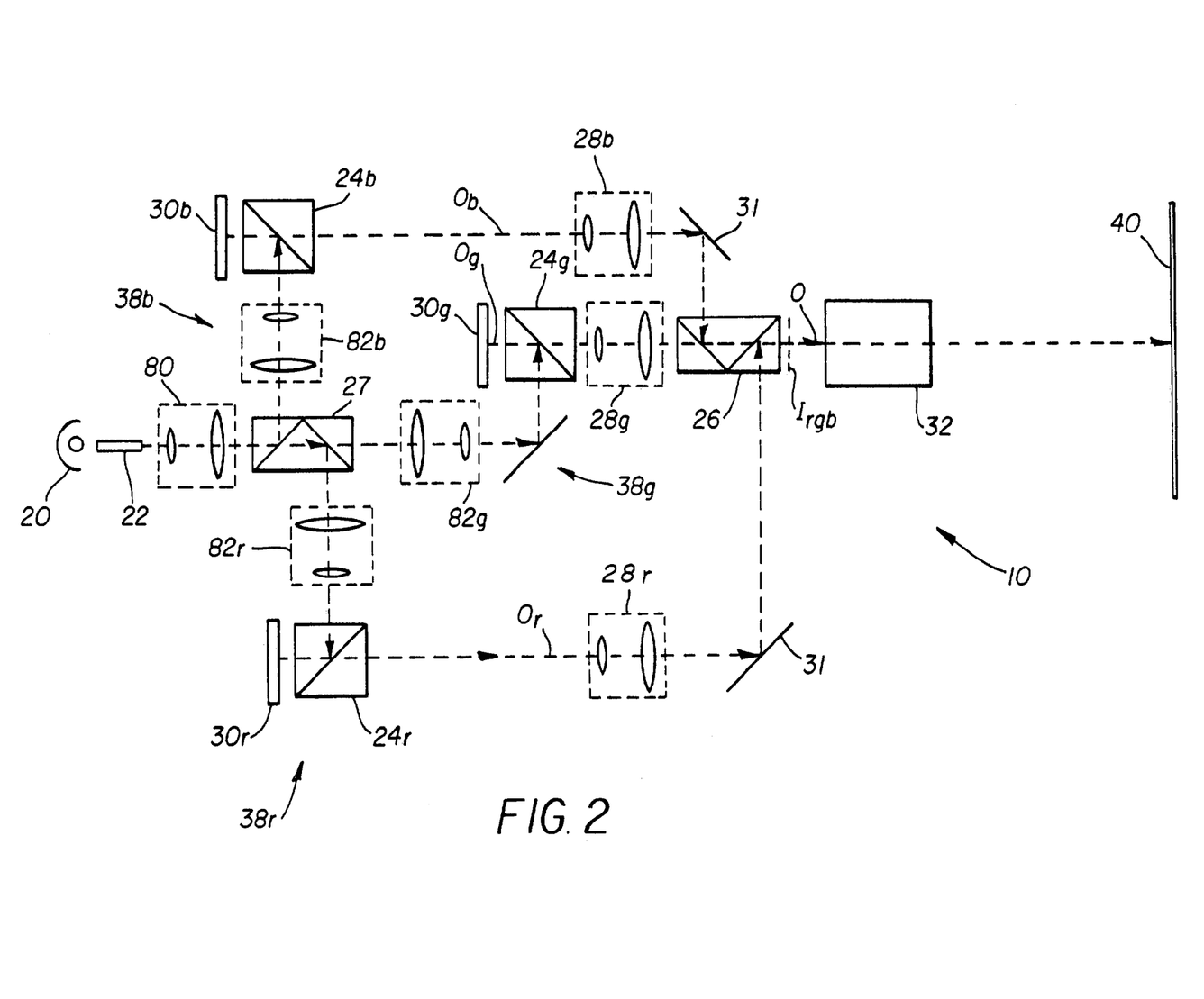
FIG. 2 is a schematic view showing key components of a projection apparatus according to the present invention.

In greater detail, the system described in FIGS. 1 and 2 utilizes intermediate image optics, in which an internal image of the spatial light modulators is created, which is in turn projected to the screen. The illumination system also utilizes an internal intermediate image optical configuration, where an internal image of the integrating bar is created, and said internal image is projected onto the spatial light modulators. Among the advantages of this system, most significantly, the intermediate internal image structure allows the color separating means, prisms, for example, to be spaced separately from the polarization prisms. In particular, the color separating means (dichroic separator 27 in FIG. 1) can be put in an optical space with a reduced numerical aperture, which helps with the design and fabrication of the prism coatings. The internal or intermediate imaging optical system of FIG. 1 offers numerous other advantages, including a reduced working distance for the projection lens 32.

However, this internal intermediate image optics also offers other advantages and opportunities, including the potential to significantly degrade the quality illicit copies by modulating the light in either the illumination or imaging paths, while leaving the visual image largely unaffected. In general, an intermediate image system, such as that of FIG. 1, offers the potential to modulate light for camcorder defeat at intermediate image planes, at aperture stop planes, in either the illumination or imaging paths, and for either white light or separate color beams. The impact on the visual image and on the illicitly recorder image can be dramatically different, depending on the details concerning the copy protection means and its location within the projection optical system.

The system of FIGS. 1 and 2 described here is illustrative of a system for which the possibility of camcorder defeat is enabled. This particular system provides illumination and modulation optics for a color projection system where brightness is maximized and color shading effects from variations in dichroic surface angular response are minimized.

Referring to FIG. 1, there is shown, in schematic form, an implementation of components used in the red optical path of projection apparatus 10 in the present invention. A polychromatic light source 20 directs source illumination through uniformizing optics 22. Light source 20 is typically a lamp, such as a xenon arc lamp, but could also be some other type of high-intensity light emitter. In a preferred embodiment, an integrating bar serves as uniformizing optics 22. Well-known in the optical design art, integrating bars, also termed light-mixing bars, use total internal reflection (TIR) effects to homogenize incident light, thereby providing a spatially uniform plane of illumination. Other options for uniformizing optics 22 include a lenslet array, such as a fly's eye array, or a diffusing screen, an integrating tunnel, fiber optic faceplate, or glass. Uniformizing optics 22 provides a uniform plane of light at its output A. As shown at the end of a uniformizing element, Plane A, which is image conjugate to both the spatial light modulator 30 and the display surface 40, is the first location that is ideally suited for the aforementioned interference element. Modulating the light here will have the effect of creating an in focus white light artifact when viewed instantaneously, which would, however ideally be modulated in such a way as to provide a spatially uniform field when integrated over time to avoid visually perceptible non-uniformities. A telecentric base condenser relay 80 images this output, magnifying the image at output A and directing the light toward the dichroic surface 36 of the dichroic separator 27. This telecentric base condenser relay 80 is shown as a pair of lenses. Between this pair, there exists an aperture stop B, which is the next logical place for an interference element. Modulating the light here will have a global (across the field or image) white light illumination level frequency variation. In order to be significantly annoying in illegally reproduced screen copies, a significant amount of light may be wasted, making this a less optimal location in the projection system.

Referring again to FIG. 1, only the red light path is illustrated; while the remaining blue and green light, that is transmitted through dichroic surface 36, illuminate separate modulation paths in a similar manner, using techniques well known in the color imaging arts. In this way, there is formed an enlarged internal image of output A for each red, green, and blue color path.

As shown in FIG. 1, the enlarged internal image C of the red color path occurs just after the dichroic surface 36. This is a preferred location for the interfering modulation. If however, the focal lengths of the telecentric base condenser relay 80 were made significantly shorter (not shown), the possibility exists to position Plane C before the dichroic surface thus enabling the internal image modulation to effect all three colors simultaneously. By modulating the light at Plane C as shown (a location which is conjugate to the spatial light modulator 30), a temporally and spatially changing, in focus artifact, can be produced in a single color. This artifact can be made especially irritating to illegally reproduced copies, is very difficult to correct for in those copies, and with an appropriately high frequency, and spatially equal application, is un-noticeable to the legitimate viewer. In FIG. 1, only the red channel is shown. However, it should be pointed out that most preferably, the modulation to create a copy protected projection should occur in the channel which has an overabundance of light. Most of the interference modulation means discussed will result in a loss of light (typically 0.01%-10% of the total). Due to coating design, desired color temperature, cost and simplicity of various coatings, it is likely that the white light image may not have the perfect color temperature. By selecting the channel in the design that has more light than necessary for the desired color balance, the loss of light caused by the interfering element can aid in achieving the correct screen color temperature.

In a light modulation assembly 38, a illumination relay lens 82 then demagnifies the colored light output from dichroic separator 27 and directs the light toward a spatial light modulator 30, effectively providing a color reduced internal image of output A at spatial light modulator 30. There is a separate illumination relay lens 82 in each color light path. As before at Plane B, this relay lens pair will have an aperture stop at or near Plane D at which, as before, a non image conjugate, global (spatially uniform) interference can be added. An aperture stop is defined as the stop which determines the diameter of the beam of light which the system can accept. Technically speaking, Plane B may have, but does not necessarily have, the actual aperture stop for the projector and Plane D would then be a plane conjugate to the aperture stop at Plane B. Unlike aperture stop B, at aperture stop D only a single color (in this case red) will be altered with the temporal interference and the light loss from the interference modulation means. The result will be a relative light level increase in the blue and green channels whilst the modulation element is reducing the light level in red. In the preferred embodiment of FIG. 1, spatial light modulator 30 is a reflective polarization modulating LCD, which has an accompanying polarizing beamsplitter 24 to discriminate between the modulated and unmodulated light. Polarizing beamsplitter 24 could be a conventional MacNeille beamsplitter or a wire-grid beamsplitter, such as those available from Moxtek Inc. of Orem, Utah or described in U.S. Pat. No. 6,122,103 (Perkins et al.), for example.

Modifying a projection apparatus 10 with a modulation interference means located at (or near) one or more aperture stop Planes D may be a most effective means for copy protection. As the temporal modulation may be present in only one color, it will be difficult for the illicit duplicator to remove the artifact without significant post processing. The copy protection might be further enhanced by placing a modulation interference means in second or third color channel, with the modulation interference means operating at different frequencies in one color channel versus another. In that case, care would need to be taken to avoid beat frequencies appearing as visibly detectable artifacts.

A image relay lens 28 forms a magnified real image at plane G of spatial light modulator 30 near or within dichroic combiner 26 (as shown, this magnified real image occurs before the dichroic combiner), an X-cube in a preferred embodiment. Image relay lens 28 is double-telecentric, so that the modulated light beam directed toward dichroic combiner 26 is in telecentric form. As in the previous illumination lenses, there is an aperture stop F within the double telecentric relay. Modulation using an interference modulation means at or near the aperture stop at Plane F can produce a color specific, spatially equal (uniform), frequency based color modulation. Applying modulation interference means at Plane F (in the imaging relay 28) is very similar to applying the modulation interference at Plane D (in the illumination relay). However, it may be preferable to modulate at Plane D versus Plane F, as the illumination can be modified with less risk to the image quality.

Assuming that the real image at Plane G is formed outside and prior to the dichroic combiner 26, this location will also allow for a color specific, in focus image modulation with any of the methods previously discussed. It would also be possible to design the focal length of the image relay lens 28 such that the magnified real image occurs after the dichroic combiner 26. As before, the possibility would then exist to modulate all three colors simultaneously. Because dichroic combiner 26 handles telecentric light, there is minimal tendency for color shading across magnified real image at Plane G due to angular variances. Significantly, by magnifying the image formed on spatial light modulator 30 with some magnification factor greater than 1×, image relay lens 28 also effectively focuses magnified real image F at a higher f/# than 1× relay operation would provide. As a result, dichroic combiner 26 handles a narrower spectral band along this color channel and is thereby able to provide a larger color gamut than would be achievable under a lower f/#. Moreover, with the use of image relay lens 28, no light is lost even though a higher f/# is achieved at dichroic combiner 26, since a low f/# is still used at spatial light modulator 30. As a result, an improved magnified real image at Plane G is provided at or near the dichroic combiner 26.

The arrangement of FIG. 1 also provides advantages for lowering cost and complexity requirements of projection lens 32. Projection lens 32 is shown schematically as a single element, however most projection lenses have a multiplicity of lenses. With the arrangement of FIG. 1, projection lens 32 can advantageously work at a higher f/# in order to project a multicolor image combined from the magnified real image formed in each color path, such as in the red path as shown at Plane G. In addition, projection lens 32 needs only a small working distance to project the multicolor image onto display surface 40. Projection lens has an aperture stop at Plane H that can support the use of an interference modulation means that can be used to produce global light level changes similar to those that could be provided at Plane B. Typically, the aperture stop at plane H is the limiting aperture stop for the entire projection system, thereby making Planes B, D and F conjugate aperture stops. As with Plane B, it would not be difficult to correct for this artifact in an illegally produced copy. However, adding the modulation element to the projection lens would provide for an easy retrofit to existing installations.

Referring now to FIG. 2, there is shown a schematic block diagram of projection apparatus 10 showing all three color modulation paths. The image and focal planes discussed in FIG. 1 are not shown here, but exist exactly as before. The design and operation of the projection apparatus 10 of FIG. 2 will now be explained in greater detail, so that the opportunities for adding an interference modulation means for copy protection can in turn be better understood.

Referring again to FIG. 2, uniformized light from light source 20 is split into red, green, and blue light at dichroic separator 27, which in this case, is shown as a V-prism. In a red light modulation assembly 38r, a red illumination relay lens 82r demagnifies the red light and directs this light to a red spatial light modulator 30r, with a red polarizing beamsplitter 24r to provide modulated light along a red optical axis $O_r$. A red image relay lens 28r then directs the modulated light on red optical axis $O_r$ to dichroic combiner 26. A turning mirror 31 may be used if needed in the optical path. Similarly, in a green light modulation assembly 38g, a green illumination relay lens 82g demagnifies the green light and directs this light to a green spatial light modulator 30g, with a green polarizing beamsplitter 24g to provide modulated light along a green optical axis $O_g$. A green image relay lens 28g then directs the modulated light on green optical axis $O_g$ to dichroic combiner 26. Likewise, in a blue light modulation assembly 38b, a blue illumination relay lens 82b demagnifies the blue light and directs this light to a blue spatial light modulator 30b, with a blue polarizing beamsplitter 24b to provide modulated light along a blue optical axis $O_b$. A blue image relay lens 28b then directs the modulated light on blue optical axis $O_b$ to dichroic combiner 26. A multicolor magnified real image $I_{rgb}$ is then projected by projection lens 32 to display surface 40.

As described in the background material given above, projection apparatus 10, with its construction, employing intermediate internal images, provides a high level of performance by maximizing brightness and by minimizing color shading and related aberrations. By comparison, with more conventional optical design approaches, the coating performance at dichroic surfaces of dichroic separator 27 or of dichroic combiner 26 constrain the system brightness. In particular, increasing the brightness of available light in conventional systems comes at the expense of allowing higher incident light angles at the various dichroic surfaces. The resulting color shift across the field degrades color performance and degrades the overall efficiency of the system.

The arrangement of FIGS. 1 and 2 overcome this problem by conditioning the angle of incident light at key points in the system. First, maximum uniformity is achieved where uniformizing optics 22 operate with a low f/#. In the configuration of FIGS. 1 and 2, the uniformizing optics 22 (an integrating bar in a preferred embodiment) operate at approximately f/1.31. This low f/# allows the light traveling through the integrating bar to have multiple bounces through the bar and also allows integrating bar dimensions to be minimized. However, this also means that uniformized light emerges at high incident angles, which are not favorable at dichroic separator 27. At the same time, the size of the surface at output A of uniformizing optics 22 is small relative to the size of the imaging surface of corresponding spatial light modulators 30, 30r, 30g, and 30b. In order to correct for these angular and size disadvantages, base condenser relay 80 provides approximately 3.5× magnification to the uniformized output of uniformizing optics 22. This magnification effectively provides incident light to dichroic separator 27 at f/4.6, which is well within the acceptable range for the design and fabrication of the required dichroic color separating coatings. The magnified image (at Plane C) of output A is, however, now too large relative to the surface of spatial light modulators 30, 30r, 30g, and 30b. Illumination relay lens 82, 82r, 82g, and 82b, therefore, provide 0.5× magnification. This not only reduces the image size of uniformizing optics 22 output, but also increases the incidence angle of the illumination provided to spatial light modulators 30, 30r, 30g, and 30b. As a result, the illumination is delivered at approximately f/2.3, which is within a desirable range for most LCD and other spatial light modulators 30, 30r, 30g, and 30b. Thus, by magnifying and demagnifying the uniformized illumination output at key points, the apparatus of the present invention optimizes brightness and minimizes color degradation that would otherwise be caused by high incident angles at dichroic separator 27. It must be emphasized that each color light modulation path (for example, red, green, and blue) has a separate illumination relay lens 82r, 82g, and 82b. This arrangement allows reducing each relay 82r, 82g, and 82b to be designed for best performance over a specific range of wavelengths.

It is instructive to note that, from the perspective of projection lens 32, combined multicolor magnified image $I_{rgb}$ may be a real image or a virtual image, depending on where the individual magnified real images I in each color path are formed relative to the spatial position of dichroic combiner 26. Combined multicolor magnified image $I_{rgb}$ forms a real image whenever the individual magnified real images I are formed between the front surface of dichroic combiner 26 and the rear of projection lens 32. This arrangement is indicated by the position of combined multicolor magnified image $I_{rgb}$ in FIG. 2. In contrast, if the individual magnified real images I are formed between the front surface of relay lenses 28r, 28g, and 28b and the front surface of dichroic combiner 26, combined multicolor magnified image $I_{rgb}$ is a virtual image with respect to projection lens 32. That is, there is no actual spatial "location" of combined multicolor magnified image $I_{rgb}$ in such a case. Instead, dichroic combiner 26 operates to combine the individual magnified real images I in each color path as a virtual combined multicolor magnified image $I_{rgb}$.

Whether combined multicolor magnified image $I_{rgb}$ is a real image or a virtual image, projection lens 32 is then designed with the necessary back focal length for projecting combined multicolor magnified image $I_{rgb}$ to display surface 40, from wherever combined multicolor magnified image $I_{rgb}$ is formed. Projection lens 32 may alternately incorporate an anamorphic attachment (not shown) for adjusting the aspect ratio of the projected image, as is well known in the image projection arts.

The high f/# requirements, smaller relative size, reduced number of components, and relaxed tolerances made possible by the present invention reduce the cost and complexity of projection lens 32 design for digital projection. Projection lens 32 can therefore be designed to be easily interchangeable, such as for different screen sizes for example.

Illumination relay lens 82 consists of two lenses and depending on overall path lengths of the various color channels and optical design, may also include a folding mirror or an aperture. Illumination relay lens 82 is also double-telecentric, which helps to minimize color shifts due to angular response characteristics of dichroic separator 27 and to minimize contrast loss due to the angular response of spatial light modulator 30.

Dichroic separator 27 could also be an X-cube or X-prism, a Philips prism, or an arrangement of dichroic surfaces 36 that provide a color splitting function. In addition, the dichroic combiner 26 can be an X-cube or X-prism, a Philips prism, or another arrangement of dichroic surfaces that will recombine the color channels. For example, in the system of FIG. 2, both the dichroic separator 27 and the dichroic combiner 26 are depicted as V-prisms. In all embodiments, it must be noted that an ideal arrangement would provide optical paths of equal length for red, blue, and green color modulation.

Likewise, the configuration may be slightly different from those shown in FIGS. 1 and 2 if different elements serve as the spatial light modulators. The system was described with respect to an LCD spatial light modulator. For other types of spatial light modulator, polarizing beamsplitter 24 would not be necessary. Where a DMD device or transmissive LCD is employed as spatial light modulator 30, light from illumination relay lens 82 goes directly to spatial light modulator 30. Where a DMD is used as spatial light modulator 30 appropriate adaptations would be made to the imaging optics path, such as substitution of a total internal reflection (TIR) beamsplitter for polarizing beamsplitter 24, as is well known in the digital projection art.

With these improvements, then, the present invention boosts the imaging performance of projection apparatus 10 and allows simpler, more compact optical design at minimal cost, whilst providing planes (image Planes A, C, and G; aperture stop Planes B, D, and F) in space wherein the art of camcorder defeat can be performed.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the amount of magnification provided by base condenser relay 80 can be any value greater than 1×, and should be suitably matched to the dimensions and characteristics of uniformizing optics 22 and of other components in the imaging path. Similarly, the demagnification provided at illumination relay lens 82r, 82g, and 82b and image relay lenses 28r, 28g, and 28b should be matched to suit the characteristics of components within their respective light modulation assemblies 38r, 38g, and 38b.

While the optimal arrangement is to provide a fully telecentric light path in each color modulation channel, it may be advantageous to provide this arrangement in only one or two color channels for projection apparatus 10, for example.

Not shown or described in detail are a number of additional supporting polarization components conventionally used to improve contrast and performance of LCD spatial light modulators 30. A polarizer (not shown) could be deployed between uniformizing optics 22 and base condenser relay 80 or, optionally, in each color path before or after illumination relay lens 82. The present invention allows the use of any suitable type of illumination system for providing source colored light for modulation by spatial light modulators 30. Light source 20 could include various types of lamps, filters, LEDs, lasers or other illumination components. For an expanded or alternate color gamut, more than three color light modulation paths can be provided.

Now that an exemplary system has been described with planes (image Planes A, C, and G; aperture stop Planes B, D, and F) suited to the practice of copy protection, specific interference elements, and preferred embodiments for the practice of the invention will be further described.

Figure 3A:
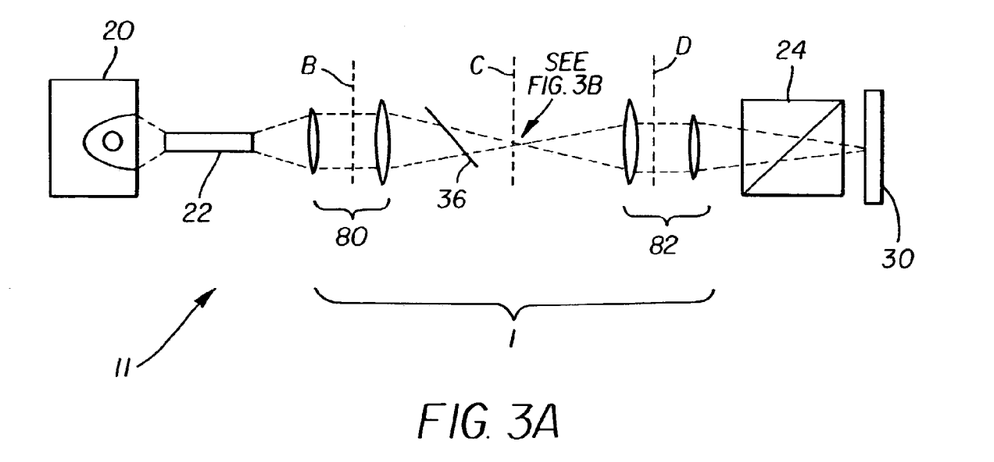
FIG. 3A is a schematic block diagram showing a projection system.
Figure 3B:
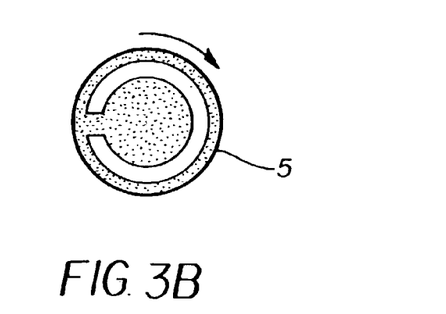
FIG. 3B is an illumination copy protection module.

In it's most basic form, the copy protection method of this invention can be performed with copy protection modules consisting of both the optics to create a plane suited to a modulation element and the actual interference modulation element. Referring to FIGS. 3A and 3B, there is shown a schematic for a copy protection illumination system 11, containing a source of light 20, uniformization means 22, a copy protection illumination module 1, which consists of a pair of condensing lenses 80, 82 providing both aperture stops (Planes B, D) and an image plane conjugate to the spatial light modulator image plane (Plane C), and an interference modulation element 5, to provide the copy protection feature. The interference modulation element 5 is shown as a spinning wheel with a once per revolution blocking means. This is only for illustrative purposes and many possible interfering elements will be discussed. Though not required for the practice of the invention, the copy protection illumination module 1, likely also encompasses a color splitting dichroic surface 36. In FIG. 3A the light is shown passing through the splitting dichroic surface 36. FIG. 3B also shows the interference modulation element being located at Plane C, where it could temporally modulate a color channel in a fashion that causes a spatial variation at the spatial light modulator 30 (which is conjugate to Plane C). Alternately, the interference modulation element 5 could be located at Plane B, where it could temporally modulate the white light image in a spatially invariant fashion, or at Plane D, where it could temporally modulate a color channel in a spatially invariant fashion.

The remainder of the projector can be of any design known in the projection arts, and will likely contain some form of spatial light modulation 30, and a projection lens (not shown).

Figure 4A:
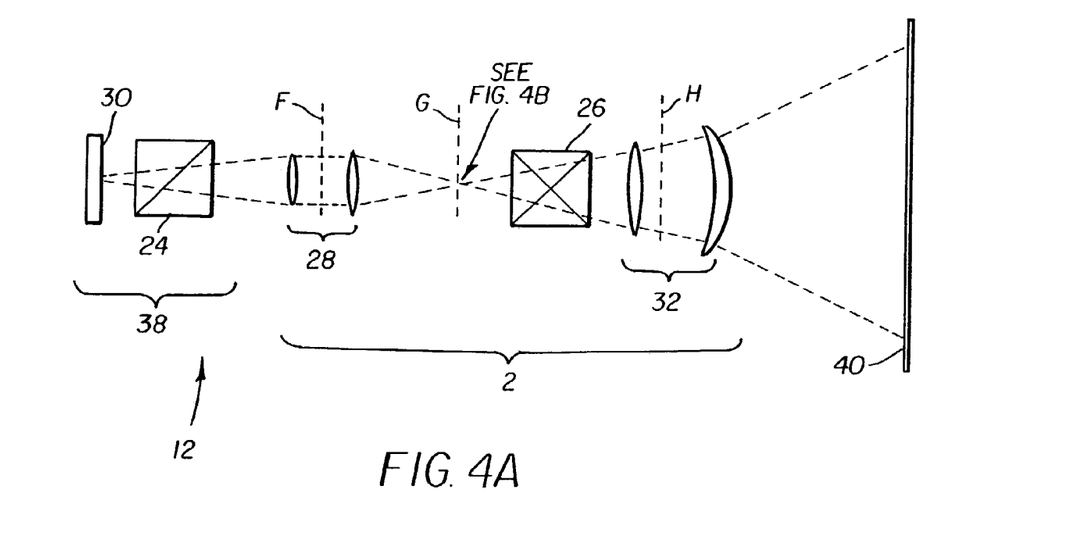
FIG. 4A is a schematic block diagram of another embodiment showing a projection system.
Figure 4B:
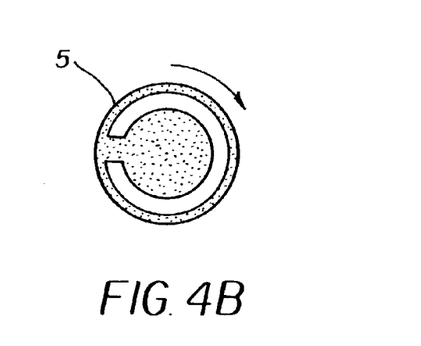
FIG. 4B is an imaging copy protection module.

Referring now to FIGS. 4A and 4B, there is shown a schematic of a copy protection imaging system 12 containing an image generating spatial light modulator 30 (again only one color is shown), a copy protection imaging module 2, containing a relay lens 28 with an aperture stop (Plane F) and internal image of the spatial light modulator plane (Plane G), an interference modulator element 5 to provide the temporal interference, and a projection lens 32. As before in the illumination system, such a module for practical purposes in a three color projection system will also contain a color combining element 26. After the image produced at the spatial light modulator 30 has been relayed to an internal image Plane G by the relay lens 28, and interference modulated, it is projected to a display surface 40 by a projection lens 32. Alternately, the interference modulation element 5 could be located at Plane H, where it could temporally modulate the white light image in a spatially invariant fashion, or at Plane F, where it could temporally modulate a color channel in a spatially invariant fashion.

Examples of various interference modulation devices are electro optical modulators, or mechanical blocking elements that would include wires, mirrors, opaque materials, solid materials, irises, and shutters. All of these devices need to be modulated at frequencies higher than the human flicker perception frequency, and optimally at a frequency that is most destructive to camcorder off the screen reproductions. The selection of an appropriate blocking means is dependent on the specific plane location and application. For example, a solenoid activated iris may be ideal for reducing the level of illumination at an aperture stop location (Planes B, D, and F), however because it would not uniformly block the entire field on a time averaged basis, it would be less desirable at an internal image plane (Planes A, C, and G).

Mechanical blocking elements must ideally be presented and removed at the desired interference frequency. Methods of presenting and removing the mechanical blocking element are apparent to anyone versed in the art and might include motors, cams, and mechanical oscillators.

At an internal image plane requiring time averaged, spatially uniform light blocking, standard film motion picture shutters which are generally rotated by electric motor can be adapted to the purpose of creating interference. They commonly block about 50% of the light, such as described in U.S. Pat. No. 6,513,932, but can be adapted to this purpose by removing shutter material such that a much smaller fraction of the light is blocked. In addition, the rotational speed of such shutters should be varied within the preferred frequency range to avoid the possibility of the camcorder frame rate being in synch. This kind of shutter could also be used at aperture stop planes (Planes B, D, and F).

Focal plane shutters such as commonly practiced in SLR camera manufacture are also excellent for an internal image location due to their approximately correct size, quick response, and even field blocking. Slight modification may be required to deal with the amount of heat that may be absorbed by such a shutter. This modification in design may be a change to a reflective surface instead of the absorptive surfaces generally practiced in the art of camera shutter design. The practice of the invention is not dependent on any of these exemplary designs, nor in fact a mechanical blocking device.

As discussed, if located anywhere other than at an aperture stop, for example at a plane conjugate to the imaging device (image Planes A, C, and G), a light blocking device (either mechanical or electro-optical) must be moved throughout the field of interest, ideally covering the entire field equally at the optimal interference frequency. If, at an internal image plane conjugate to the image device, this spatial mechanical blocking is not done evenly, uneven field illumination or color shading will result. In this case, uneven field illumination or color shading may be present as a visually perceptible artifact when viewing a legitimate showing as a result of the interference modulation. This undesirable result can be compensated for either in the input data stream or in color correction commonly applied to the driver signals of spatial light modulators to remove artifacts.

This correction can take many forms. An example of a color correction applied to an LCD can be found in commonly-assigned copending U.S. patent application Ser. No. 09/606,891, filed Jun. 29, 2000, entitled A METHOD AND APPARATUS FOR CORRECTING DEFECTS IN A SPATIAL LIGHT MODULATOR BASED PRINTING SYSTEM, by Barnick. U.S. patent application Ser. No. 09/606,891 describes making a map to correct for defects in an LCD based printer system. This method can be applied to digital projection by first taking a picture from a flat field projected image on the screen (with the copy protection scheme in operation). The remainder of the methods discussed by Barnick are applicable in terms of making non-uniformity correction. The method would correct for any defects or non-uniformity in the entire optical system. Therefore, provided the time averaged non-uniformity caused by the copy protection is spatially consistent and stable, it will be compensated for along with any defects or non-uniformity in the LCDs or the remainder of the optical system.

In some applications, it may be desirable for space, cost, vibration, or other reasons to not use a mechanical blocking means. As mentioned, electro-optical modulation is possible to achieve copy protection. The electro-optical modulator could be a liquid crystal display material, with electrically controlled transmission characteristics, may be used to construct such a spatial light modulation mask; the opacity of different regions of such a mask may be controlled by changing the applied electrical signal to that region of the mask, preferably at the optimal interference frequency. As they can be precisely controlled spatially over the entire device, it is possible to create pseudo-random, time-averaged spatially even blocking which is ideal for many of the planes previously discussed. Devices using this technology are commonly available from Meadowlark Optics Inc., such as part number LVR 200. Alternately, electro optical devices can reflect, absorb, change polarization state or scatter the light.

At an internal image plane (Planes A, C, and G), a real image of the blocking means is created, allowing for the possibility of creating watermarks specific to the projector where the copying was done. For example, in the case of a spinning wheel creating a once per revolution disturbance with a shutter blade, a message can be physically carved into the blade. This message can be words "illegally copied at XYZ theatre by S/N 12345", or a barcode style signature.

An additional benefit of electro-optical modulation at an internal image plane is the ease of customized watermarking. A watermark can be introduced through addressing pixels on the electro-optical modulator in such a way as to create a written or coded message (stating for example the date and location of the projection), and if required, balanced spatially by preferentially not blocking the pixels required to create the watermark in time frames around the projection of the watermark. This message is addressable for each showing allowing for sophisticated watermarking to be done (customized for theatre, screen, date, time, projectionist, etc.)

As another method for frustrating efforts at illicit copying, the modulation frequency or frequencies of the modulation interference means could be changed from show to show, or even within the showing of a given feature. As a result, the individuals attempting to make the illicit copies could not assume they will be affected by constant operational conditions.

EMBODIMENT 1

The first embodiment provides for light to be temporally modulated in positions of the digital projection system where there will be a spatially global spatially invariant effect on the light level of an image. Most obviously, the light can be modulated at the at/near the stop of the image relay lens 28 (Plane F) or illumination relay lens 82 (Plane D) assemblies. At these positions, the image is not in focus meaning that any transitions of a mechanical element being presented or removed will not be apparent to an observer. In addition, at Planes D and F, only one color is being modulated, causing the effect as shown on an illegal copy, to be an excess of the other two colors. Thus, the illicit copy may suffer both a temporal strobing or flicker effect, from the interaction of the camera's capture sampling frequency and the modulation frequency of the interference modulation means, but the illicitly sampled images may also have an incorrect color rendition.

Each of the color channels can be modulated in the illumination path before being split into separate color channels providing white light modulation (Plane B), or in a region containing just a single color (Plane D), or independently in a set or random sequence for this purpose (flashing R G B G B R B G, etc.) by placing interference means at the respective Planes D for each of the color channels. Optimally, as discussed previously, the modulation would occur at frequencies detected by the camcorder, but not by the human observers. More optimally still, these frequencies can be varied to avoid the capability of the camcorder being able to synchronize.

If a single color is used, then in terms of the illumination system design, the color selected for modulation would preferably be the color where there is extra power to spare (above color balance levels). In design of the spectral content of the various channels by the splitting element, there is a possibility of coating design and/or dictating that the light is not split optimally between the three color channels for the desired final color temperature. By selection of the color which is over abundant in an illumination system, the modulation device which by it's nature will cut out a portion of that color's illumination will help compensate for the aforementioned overabundance.

If the modulation device is located in the illumination relays (Plane D), it has the advantage of not causing flare or ghost artifacts in the image. Alternately, locating it in the imaging relays (Plane F) reduces the incident power levels. This approach has the advantage that the entire image is effected uniformly.

EMBODIMENT 2

A digital projection system 10 with a pair of relaying condensing optics 80, 82 in the illumination path or image relaying optics 28 in the imaging path uniquely provides the potential to interact with the intermediate image planes. In FIG. 1, Plane A at the end of the uniformizing optics 22, Plane C after the color splitting element, the spatial light modulator Plane E, and Plane G which is an internal image of a single color are all in focus internal images. In many other film or digital projection systems, there are no planes in the illumination and imaging optical paths that provide access to an intermediate image, either because they do not exist, or more commonly because there are spatial light modulators or other imaging elements located at those planes.

Once access to the internal image has been provided by the optical design, many possibilities present themselves for off the screen camcorder defeat methods. For example, an interfering object could be moved about in the image plane at a frequency seen by the camcorder, providing both spatial and temporal effects. The interfering object (a wire for example) could be opaque or semi-transparent. As compared to the approach of Embodiment 1 where the interfering element was at an aperture stop location and therefore not in focus, it will be more difficult for this approach to avoid human perceptible artifacts as the object is in focus. A transparent or semi-transparent object might help make the interference less apparent to a human observer, however most preferably, the modulation of an interfering object at an intermediate image plane is maintained at a frequency above the flicker threshold of the human observer.

In addition, it is critical to maintain field uniformity by assuring that the interfering object blocks all portions of the image equally when time averaged over several frames. The object could possibly also be an addressable area optical modulator, provided it had high throughput in the visible (other attributes: low CR modulation, low to modest resolution, fast). The object could also be a high spatial frequency opaque amplitude grating or transparent phase grating artifact that caused diffraction, that could then be Schlieren/Fourier plane filtered in the stop of the projection lens.

It may be advantageous to perform the interference at a location in the optical path where the optical beam or field is at a relatively small size. For many of the methods contemplated, a mechanical device is required to move within the frame. The actuators and mechanical fixturing required to present and remove a mechanical interference element can be optimally made smallest where the beam is smallest. The same holds true for the electro-optical elements in that less costly devices and device drivers can be created when a smaller field needs to be modulated. Although the size of the interfering element is reduced in a small beam location of the optical path, the optical power density and thermal loading are both high, requiring care in the thermal design of the interference modulation element.

In general, the same concepts could be applied at other planes conjugate to the intermediate image plane, such as the LCD planes (which are largely inaccessible) or at the illumination color splitter (Plane C). In such a way, the image could be altered on a color basis.

As before in the aperture stop position, if a single color is selected for interference, the color selected for modulation would preferably be the color where there is extra power to spare (above color balance levels). In design of the spectral content of the various channels by the splitting element, there is a possibility of coating design and/or dictating that the light is not split optimally between the three color channels for the desired final color temperature. By selection of the color which is over abundant in an illumination system, the modulation device which by it's nature will cut out a portion of that color's illumination will help compensate for the aforementioned overabundance.

EMBODIMENT 3

The image could be altered with modulation interference means placed in a beam location that is neither at an aperture stop, nor at an image plane (and deliberately well outside the depth of focus of any of the internal intermediate image planes). Examples of such locations are at planes K1 and K2 of FIG. 1. In this instance, an interference modulation device could sequentially effect cones of light that address large regions of the image plane. In particular, the interference modulation device would effect a first cone of light addressing a given region of the image, and then the interference modulation device would effect a second cone of light that address a different large region of the image plane. The cones of light could be in beam convergent space, such as several inches away from the intermediate image plane (given the large field and numerical aperture of the preferred digital projection system). This means that the image plane could be altered in a way that effects the image both spatially and temporally, but without the sensitivity/difficulty of actually having an object in focus in the image plane. In this case, the interference modulation means may comprise multiple mechanisms, or a single mechanism that is moved, or a single mechanism that has defined active regions that can be actuated independently. The same result could be accomplished by placing the modulation interference element means in the optical system in locations where the beam is divergent; and not just in convergent beam locations such as planes K1 and K2.

Individuals who illegally record images from a projection screen are prevented from making good quality copies through the use of the methods and apparatus described here. However, all of the copy protection methods described herein are dependent on hardware that is either added to an existing projector, or designed into new models. There is the possibility that this hardware could be removed by unscrupulous presenters, thus permitting the illicit duplication of theatrical presentations.

Figure 5:
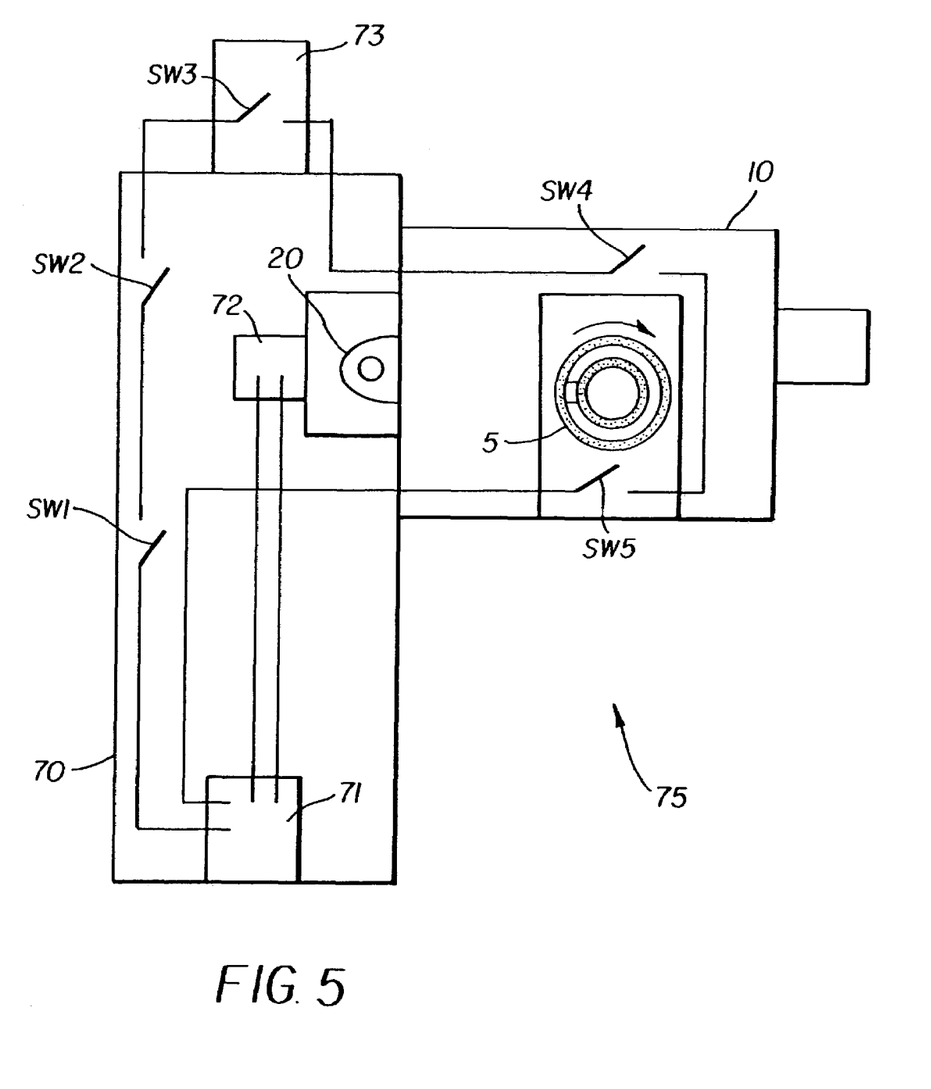
FIG. 5 shows a system for preventing the removal of copy protection devices from the projector.

This hardware removal can be prevented by adding interlocks (similar to those used today for safety) to the projector as shown in FIG. 5 to prohibit the removal of the copy prevention methods and apparatus described in this application. The infrastructure exists today in digital projectors and lamphouses to shut down power if any of the various safety interlocks are tripped, for example, if the panels on many lamphouses are opened the lamp shuts down. Referring to FIG. 5, a system is shown that provides an additional switch to these circuits to prevent the removal of the copy protection modules or related hardware.

FIG. 5 shows a projection unit 75 consisting of a lamphouse 70 which contains a power supply 71, a lamp igniter 72, a lamp 20, and an exhaust stack 73 and a digital projector. For safety reasons, a series of switches SW1-SW4 are commonly used on an interlock circuit to shut down the lamphouse or not allow the igniter to fire the lamp. As examples shown in series are SW1 and SW2 that indicate a panel is not properly in place, SW3 which indicates that there is not enough flow in the exhaust stack, and SW4 which is a thermal sensor in the projector. In response to any of these switches opening indicating a fault condition, the power supply 71 will either cut power from the lamp 20 or fail to ignite the lamp 20 using the igniter 72.

It is quite easy to add another switch SW5 to the series circuit to prevent the removal of the copy protection device 5. Obviously, a simple interlock switch may not deter the more resourceful would be illicit duplicator. More preferably, an electronic ID tag style of device is used. There are many examples of such devices with more advanced interlocks in use in the security industry. For example, many automobiles are fitted with ignition locks dependent on a specific key, and many secure buildings require proximity style badges for access. Referring again to the projector, an electronic ID tag style of device is integrally contained within the copy prevention module 5, such that the module can not be replaced with a functional equivalent without the copy prevention feature. For example, a location which was considered earlier for a copy prevention interfering element was the projection lens aperture stop (Plane H). It would be quite easy to substitute an optically equivalent projection lens. However, with a secure electronic interlock, such a substitution would shut down the projector. In a similar manner, any of the locations proposed for interference elements can be protected with an electronic interlock.

Though the most preferred and easiest to implement action of the interlock is to shut down operation of the projector, if networked, it could function as a silent alarm alerting a remote facility to potential illegal activity, or could simply set off an alarm.

| PARTS LIST | |
| --- | --- |
| 1 | Copy protection illumination module |
| 2 | Copy protection imaging module |
| 5 | Interference modulation element |
| 10 | Projection apparatus |
| 11 | Copy protection illumination system |
| 12 | Copy protection imaging system |
| 20 | Light source |
| 22 | Uniformizing optics |
| 24 | Polarizing beamsplitter |
| 24r | Polarizing beamsplitter, red |
| 24g | Polarizing beamsplitter, green |
| 24b | Polarizing beamsplitter, blue |
| 26 | Dichroic combiner |
| 27 | Dichroic separator |
| 28 | Image relay lens |
| 28r | Image relay lens, red |
| 28g | Image relay lens, green |

| -continued | |
| --- | --- |
| PARTS LIST | |
| 28b | Image relay lens, blue |
| 30 | Spatial light modulator |
| 30r | Spatial light modulator, red |
| 30g | Spatial light modulator, green |
| 30b | Spatial light modulator, blue |
| 31 | Turning mirror |
| 32 | Projection lens |
| 36 | Dichroic surface |
| 38 | Light modulation assembly |
| 38r | Light modulation assembly, red |
| 38g | Light modulation assembly, green |
| 38b | Light modulation assembly, blue |
| 40 | Display surface |
| 70 | Lamphouse |
| 71 | Power supply |
| 72 | Lamp igniter |
| 73 | Exhaust stack |
| 75 | Projection unit |
| 80 | Base condenser relay |
| 82 | Illumination relay lens |
| 82r | Illumination relay lens, red |
| 82g | Illumination relay lens, green |
| 82b | Illumination relay lens, blue |

What is claimed is:

1. A projector with enhanced security camcorder defeat including a copy protection illumination system for illuminating a spatial light modulator comprising:
   (a) a polychromatic light source;
   (b) uniformizing optics for homogenizing light from said polychromatic light source to provide a uniform illumination field;
   (c) relay optics;
   (d) dichroic optics;
   (e) an interference modulation element located at a plane in an optical path located between said polychromatic light source and said spatial light modulator; and
   (f) a detection means for determining the absence of said interference modulation element.

2. A projector with enhanced security camcorder defeat as in claim 1 wherein said absence of said interference modulation element triggers a response.

3. A projector with enhanced security camcorder defeat as in claim 2 wherein said response prevents operation of said projector.

4. A projector with enhanced security camcorder defeat as in claim 2 wherein said response is an audible or visible alarm.

5. A projector with enhanced security camcorder defeat as in claim 2 wherein said response is a signal to a third party.

6. A copy protection security system as in claim 1 wherein said detection means is an interlock switch.

7. A copy protection security system as in claim 6 wherein said interlock switch is an electronic interlock.

8. A projector with enhanced security camcorder defeat including a copy protection imaging system comprising:
   (a) a spatial light modulator;
   (b) image relay optics;
   (c) a dichroic combiner;
   (d) a projection lens;
   (e) an interference modulation element located at a plane in an optical path located between said spatial light modulator and said projection lens, or at a plane in the optical path within said projection lens; and
   (f) a detector for determining an absence of said interference modulation element.

9. A projector with enhanced security camcorder defeat as in claim 8 wherein said absence of said interference modulation element triggers a response.

10. A projector with enhanced security camcorder defeat as in claim 9 wherein said response prevents operation of said projector.

11. A projector with enhanced security camcorder defeat as in claim 9 wherein said response is an audible or visible alarm.

12. A projector with enhanced security camcorder defeat as in claim 9 wherein said response is a signal to a third party.

13. A copy protection security system as in claim 8 wherein said detector is an interlock switch.

14. A copy protection security system as in claim 13 wherein said interlock switch is an electronic interlock.

15. A projector with enhanced security camcorder defeat for projecting a multicolor image onto a display surface comprising:
  (a) a polychromatic light source;
  (b) uniformizing means for homogenizing light from said polychromatic light source to provide a uniform illumination field;
  (c) condenser relay optics for directing said uniform illumination field toward a dichroic separator, said dichroic separator providing colored light for a first, second, and third colored channel;
  (d) wherein each colored channel is similarly constructed and comprises:
    (i) an illumination relay lens for imaging and directing said colored light in said colored channel towards;
    (ii) a spatial light modulator for forming a first image thereon; and
    (iii) an image relay lens for focusing and relaying a real image of said first image towards a dichroic combiner;
  (e) said dichroic combiner forming a multicolor image by combining said real image from said first colored channel, said real image from said second colored channel, and said real image from said third colored channel;
  (f) a projection lens for projecting said multicolor image toward said display surface;
  (g) an interference modulation element located at a plane in an optical path located between said polychromatic light source and said projection lens, or at a plane in the optical path within said projection lens; and
  (h) a detector for determining the absence of said interference modulation element.

16. A projector with enhanced security camcorder defeat as in claim 15 wherein absence of said interference modulation element triggers a response.

17. A projector with enhanced security camcorder defeat as in claim 16 wherein said response prevents operation of said projector.

18. A projector with enhanced security camcorder defeat as in claim 16 wherein said response is an audible or visible alarm.

19. A projector with enhanced security camcorder defeat as in claim 16 wherein said response is a signal to a third party.

20. A copy protection security system as in claim 15 wherein said detector is an interlock switch.

21. A copy protection security system as in claim 20 wherein said interlock switch is an electronic interlock.

* * * * *